United States Patent
Byun

(10) Patent No.: US 10,564,879 B2
(45) Date of Patent: Feb. 18, 2020

(54) MEMORY SYSTEM AND OPERATION METHOD FOR STORING AND MERGING DATA WITH DIFFERENT UNIT SIZES

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 17 days.

(21) Appl. No.: 16/043,714

(22) Filed: Jul. 24, 2018

(65) Prior Publication Data

US 2019/0187900 A1  Jun. 20, 2019

(30) Foreign Application Priority Data

Dec. 20, 2017 (KR) .................. 10-2017-0176214

(51) Int. Cl.
*G06F 3/06* (2006.01)
*G06F 12/02* (2006.01)

(52) U.S. Cl.
CPC .............. *G06F 3/064* (2013.01); *G06F 3/061* (2013.01); *G06F 3/0679* (2013.01); *G06F 12/0246* (2013.01); *G06F 2212/1044* (2013.01); *G06F 2212/7203* (2013.01)

(58) Field of Classification Search
CPC ......... G06F 12/0246; G06F 2212/7202; G06F 3/0679; G06F 3/064; G06F 3/0659; G06F 2212/2022; G06F 2212/7203; G06F 3/061; G06F 3/0613; G06F 3/0631; G06F 3/0632; G06F 3/0652
See application file for complete search history.

(56) References Cited

U.S. PATENT DOCUMENTS

| 9,141,528 B2 | 9/2015 | Gorobets et al. | |
|---|---|---|---|
| 2011/0252187 A1* | 10/2011 | Segal | G06F 12/0246 711/103 |
| 2013/0326125 A1* | 12/2013 | Chang | G06F 12/0246 711/103 |
| 2015/0177985 A1 | 6/2015 | Kondo et al. | |
| 2015/0177986 A1 | 6/2015 | Kondo | |
| 2016/0011790 A1 | 1/2016 | Rostoker et al. | |
| 2016/0026406 A1 | 1/2016 | Hahn et al. | |

FOREIGN PATENT DOCUMENTS

KR  101561546  10/2015

* cited by examiner

*Primary Examiner* — Reginald G Bragdon
*Assistant Examiner* — Thanh D Vo
(74) *Attorney, Agent, or Firm* — IP & T Group LLP

(57) ABSTRACT

A memory system may include: a memory device including a plurality of memory blocks, each including a plurality of pages for storing data; and a controller including a first memory, suitable for storing segments of data corresponding to a plurality of commands received from a host, in the first memory, storing the segments stored in the first memory, in first memory blocks among the memory blocks by a first unit size, in correspondence to data sizes and data types of the segments, and storing the segments stored in the first memory blocks, in second memory blocks among the memory blocks by a second unit size.

18 Claims, 12 Drawing Sheets

US 10,564,879 B2

MEMORY SYSTEM AND OPERATION METHOD FOR STORING AND MERGING DATA WITH DIFFERENT UNIT SIZES

CROSS-REFERENCE TO RELATED APPLICATION

This application claims priority under 35 U.S.C. § 119(a) to Korean Patent Application No. 10-2017-0176214 filed on Dec. 20, 2017, which is incorporated herein by reference in its entirety.

BACKGROUND

1. Field

Exemplary embodiments relate to a memory system and, more particularly, to a memory system which processes data with respect to a memory device, and an operating method thereof.

2. Discussion of the Related Art

The computer environment paradigm has moved to ubiquitous computing systems that can be used anytime and anywhere. The use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts (e.g., a mechanical arm with a read/write head) as compared with a hard disk device. Examples of memory systems having such advantages include universal serial bus (USB) memory devices, memory cards having various interfaces, and solid-state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an embodiment, a memory system may include: a memory device including a plurality of memory blocks, each including a plurality of pages for storing data; and a controller including a first memory, suitable for storing segments of data corresponding to a plurality of commands received from a host, in the first memory, storing the segments stored in the first memory, in first memory blocks among the memory blocks by a first unit size, in correspondence to data sizes and data types of the segments, and storing the segments stored in the first memory blocks, in second memory blocks among the memory blocks by a second unit size.

The controller may store the segments stored in the first memory, in a second memory included in the host, by the first unit size, merges the segments stored in the second memory, by the second unit size, and stores the segments merged in the second memory, in the second memory blocks.

For the segments stored in the second memory blocks, the controller may discard corresponding segments in the second memory and may erase corresponding segments in the first memory blocks.

The controller may store the segments stored in the first memory, in the first memory blocks, in the case where the data sizes is smaller than a threshold value, and may store the segments stored in the first memory, in the second memory blocks, in the case where the data sizes are equal to or larger than the threshold value.

The controller may store the segments stored in the first memory, in the first memory blocks, in the case where the data types are a first type, and may store the segments stored in the first memory, in the second memory blocks, in the case where the data types are a second type.

In the case where data types of segments stored in the first memory blocks are changed to the second type in correspondence to aging of and access to the first memory blocks and the segments stored in the first memory blocks, the controller may load the segments stored in the first memory blocks, in the second memory, merges the segments loaded in the second memory, by the second unit size, and may store the segments merged in the second memory, in the second memory blocks.

In the case where the host and the memory system are powered on again after a power-off occurs in the host and the memory system, the controller may load the segments stored in the first memory blocks, in the second memory, may merge the segments loaded in the second memory, by the second unit size, and may store the segments merged in the second memory, in the second memory blocks.

After checking parameters for the first memory blocks, the controller may select third memory blocks among the first memory blocks in correspondence to the parameters, and may load segments stored in the third memory blocks, in the second memory.

The controller may merge the segments loaded in the second memory, by the second unit size, and may store the segments merged in the second memory, in the second memory blocks, and, for the segments stored in the second memory blocks, may discard corresponding segments in the second memory and may erase corresponding segments in the third memory blocks.

The first memory blocks may be memory blocks which store single-bit data, and the second memory blocks may be memory blocks which store multi-bit data.

In an embodiment, a method for operating a memory system, comprising: receiving a plurality of commands from a host, for a memory device including a plurality of memory blocks, each including a plurality of pages for storing data; storing segments of data corresponding to the plurality of commands, in a first memory included in a controller of the memory device; storing the segments stored in the first memory, in first memory blocks among the memory blocks by a first unit size, in correspondence to data sizes and data types of the segments; and storing the segments stored in the first memory blocks, in second memory blocks among the memory blocks by a second unit size.

The storing by the second unit size may include: storing the segments stored in the first memory, in a second memory included in the host, by the first unit size; merging the segments stored in the second memory, by the second unit size; and storing the segments merged in the second memory, in the second memory blocks.

The method may further include: discarding corresponding segments in the second memory and erasing corresponding segments in the first memory blocks, for the segments stored in the second memory blocks.

The method may further include: storing the segments stored in the first memory, in the first memory blocks, in the case where the data sizes is smaller than a threshold value;

and storing the segments stored in the first memory, in the second memory blocks, in the case where the data sizes are equal to or larger than the threshold value.

The method may further include: storing the segments stored in the first memory, in the first memory blocks, in the case where the data types are a first type; and storing the segments stored in the first memory, in the second memory blocks, in the case where the data types are a second type.

The method may further include: loading, in the case where data types of segments stored in the first memory blocks are changed to the second type in correspondence to aging of and access to the first memory blocks and the segments stored in the first memory blocks, the segments stored in the first memory blocks, in the second memory; and merging the segments loaded in the second memory, by the second unit size, and storing the segments merged in the second memory, in the second memory blocks.

The method may further include: loading the segments stored in the first memory blocks, in the second memory, in the case where the host and the memory system are powered on again after a power-off occurs in the host and the memory system; and merging the segments loaded in the second memory, by the second unit size, and storing the segments merged in the second memory, in the second memory blocks.

The method may further include: selecting, after checking parameters for the first memory blocks, third memory blocks among the first memory blocks in correspondence to the parameters; and loading segments stored in the third memory blocks, in the second memory.

The method may further include: merging the segments loaded in the second memory, by the second unit size, and storing the segments merged in the second memory, in the second memory blocks; and discarding corresponding segments in the second memory and erasing corresponding segments in the third memory blocks, for the segments stored in the second memory blocks.

The first memory blocks may be memory blocks which store single-bit data, and the second memory blocks may be memory blocks which store multi-bit data.

In an embodiment, a memory system may include: a memory device including a plurality of memory blocks, each including a plurality of pages, each storing data, wherein at least one first memory block and at least one second memory block are included in the plurality of memory blocks; and a controller electrically coupled to the memory device, the controller may include a first memory for storing data segments, corresponding to a plurality of commands entered from a host, and the controller may be suitable for copying or moving the data segments in either the at least one first memory block or the at least one second memory block based on sizes and types of the data segments.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
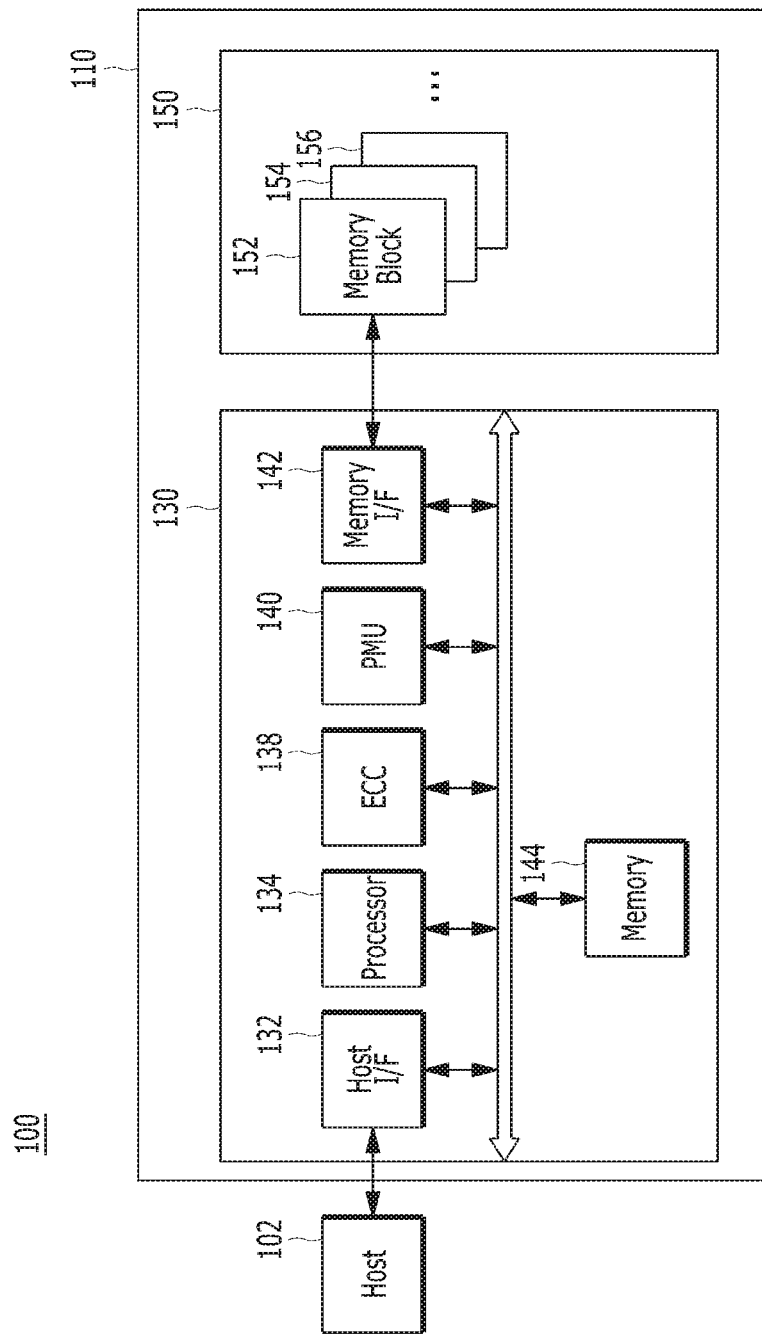
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" are used interchangeably in this specification to specify the presence of the stated elements and to not preclude the presence or addition of one or more other elements.

As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

By the way of example but not limitation, the host 102 may include portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limited examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), a reduced size MMC (RS-MMC) and a micro-MMC. The SD card may include a mini-SD card and a micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory. The flash memory may have a 3-dimensional (3D) stack structure.

The memory system 110 may include a memory device 150 and a controller 130. The memory device 150 may store data for the host 120. The controller 130 may control data storage into the memory device 150.

In an example, the controller 130 and the memory device 150 may be integrated into a single semiconductor device, which may be included in the various types of memory systems as described above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

In an example, the memory device 150 may be a non-volatile memory device and may retain data stored therein even though power is not supplied. The memory device 150 may store data provided from the host 102 through a write operation. The memory device 150 may output provide data stored therein to the host 102 through a read operation. The memory device 150 may include a plurality of memory dies (not shown). Each memory die may include a plurality of planes (not shown). Each plane may include a plurality of memory blocks 152 to 156. Each of the memory blocks 152 to 156 may include a plurality of pages. Each of the pages may include a plurality of memory cells coupled to a word line.

The controller 130 may control the memory device 150 in response to a request from the host 102. By the way of example but not limitation, the controller 130 may provide data read from the memory device 150 to the host 102, and store data provided from the host 102 into the memory device 150. For this operation, the controller 130 may control read, write, program and erase operations of the memory device 150.

The controller 130 may include a host interface F) unit 132, a processor 134, an error correction code (ECC) unit 138, a Power Management Unit (PMU) 140, a NAND flash controller (NFC) 142 and a memory 144. Each of components may be electrically coupled, or engaged with, each other via an internal bus.

The host interface unit 132 may be configured to process a command and data of the host 102, and may communicate with the host 102 under one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success or fail signal. When the number of error bits is more than a threshold value of correctable error bits, the ECC unit 138 may not correct the error bits to output the error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may manage an electrical power used and provided in the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data, entered to the memory device 150 under the control of the processor 134. The NFC 142 may work as an interface (e.g., a NAND flash interface) for processing a command and data between the controller 130 and the memory device 150. Specifically, the NFC 142 may support data transmission between the controller 130 and the memory device 150.

The memory 144 may serve as a working memory of the memory system 110 and the controller 130. The memory 144 may store data supporting operation of the memory system 110 and the controller 130. The controller 130 may control the memory device 150 so that read, write, program and erase operations are performed in response to a request from the host 102. The controller 130 may output data read from the memory device 150 to the host 102, and may store data provided from the host 102 into the memory device 150. The memory 144 may store data required for the controller 130 and the memory device 150 to perform these operations.

The memory 144 may be embodied by a volatile memory. By the way of example but not limitation, the memory 144 may be embodied by a static random-access memory (SRAM) or a dynamic random-access memory (DRAM). The memory 144 may be disposed within or out of the controller 130. FIG. 1 exemplifies an embodiment of the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may use a firmware to control overall operations of the memory system 110. The firmware may be referred to as a flash translation layer (FTL).

The processor 134 of the controller 130 may include a management unit (not illustrated) for performing a bad management operation of the memory device 150. The management unit may perform a bad block management operation of checking a bad block among the plurality of memory blocks 152 to 156 included in the memory device 150. The bad block may include a block where a program fail occurs during a program operation, due to the characteristic of a NAND flash memory. The management unit may write the program-failed data of the bad block to a new memory block.

In the memory device 150 having a 3D stack structure, the bad block management operation may reduce the use efficiency of the memory device 150 and the reliability of the memory system 110. Thus, the bad block management operation needs to be performed with more reliability.

Also, in a memory system in accordance with an embodiment of the disclosure, for instance, the controller 130 performs a plurality of command operations corresponding to a plurality of commands received from the host 102, in the memory device 150. By the way of example but not limitation, the controller 130 performs, in the memory device 150, a plurality of program operations corresponding to a plurality of write commands, a plurality of read operations corresponding to a plurality of read commands and a plurality of erase operations corresponding to a plurality of erase commands. In correspondence to the performing of command operations, the controller 130 updates metadata such as map data.

In this regard, in the memory system in accordance with the embodiment of the disclosure, the controller 130 stores data corresponding to a plurality of write commands received from the host 102, in corresponding memory blocks among the plurality of memory blocks included in the memory device 150, depending on a data size and a data type. The controller 130 performs a data merge operation and a data migration operation for data stored in arbitrary memory blocks. Also, in the memory system in accordance with the embodiment of the disclosure, after the data corresponding to the plurality of write commands entered from the host 102, are stored in a memory included in the host 102, the data move to, and are stored in, the memory blocks of the memory device 150. Further, in the memory system in accordance with the embodiment of the disclosure, in the case where the plurality of memory blocks included in the memory device 150 are single level cell (SLC) memory blocks, multi-level cell (MLC) memory blocks, triple level cells (TLC) memory blocks and quadruple level cells (QLC) memory blocks or memory blocks capable of storing more-bit data, data corresponding to write commands may be stored in corresponding memory blocks. A data merge operation and a data migration operation are performed using the memory of the host 102. Since detailed descriptions will be made below with reference to FIGS. 5 to 8 for storing of data in the memory blocks of the memory device 150 and then performing of a data merge operation and a data migration operation in the memory system in accordance with the embodiment of the disclosure, further descriptions thereof will be omitted herein.

A management unit (not shown) for performing bad management for the memory device 150 may be included in the processor 134 of the controller 130. The management unit checks a bad block in the plurality of memory blocks 152, 154, 156 included in the memory device 150. Then, the management unit performs bad block management of processing a checked bad block as a bad. For bad block management, in the case where the memory device 150 is a flash memory, e.g., a NAND flash memory, a program fail may occur when performing data write, e.g., data program, due to a characteristic of the NAND flash memory. A memory block where a program fail occurrs is processed as a bad block and program-failed data are written, i.e., programmed, in a new memory block. Moreover, in the case where the memory device 150 has a 3-dimensional stack structure as described above, if a corresponding memory block is processed as a bad block according to a program fail, because the utilization efficiency of the memory device 150 and the reliability of the memory system 110 may deteriorate abruptly, it is necessary to reliably perform bad block management. Hereinbelow, a memory device in the memory system in accordance with an embodiment of the disclosure will be described below in detail with reference to FIGS. 2 to 4.

Figure 2:
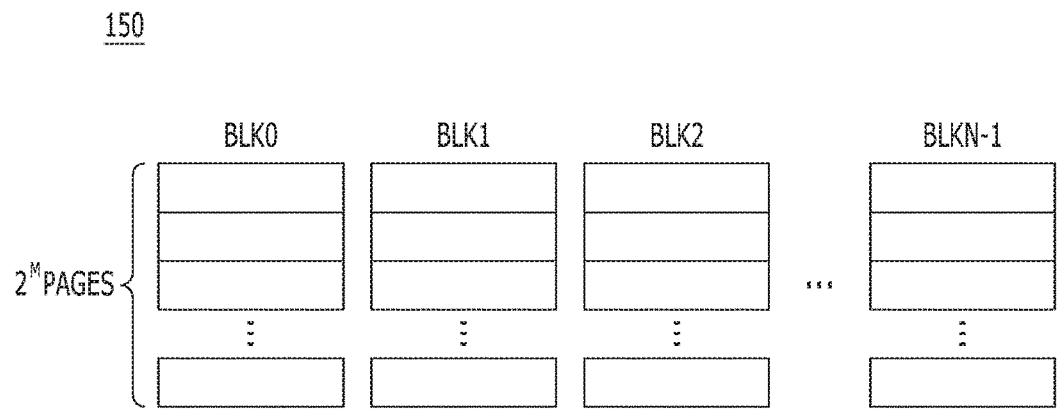
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC), each storing 1-bit data, or a multi-level cell (MLC), each storing 2 or more bit data. In an embodiment, the memory device 150 may include a plurality of triple level cells (TLC), each storing 3-bit data. In another embodiment, the memory device may include a plurality of quadruple level cells (QLC), each storing 4-bit level cell.

Figure 3:
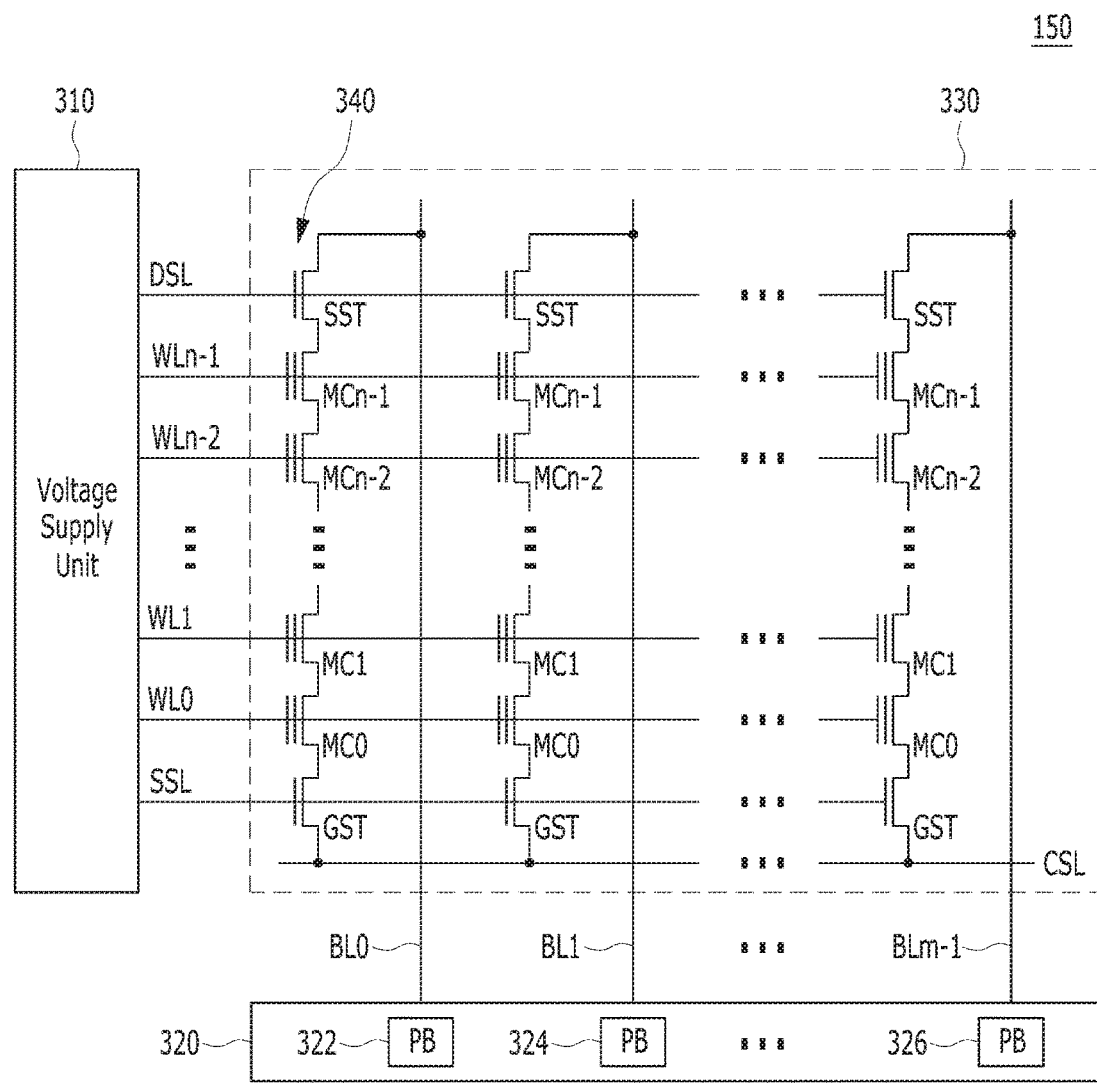
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage onto bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
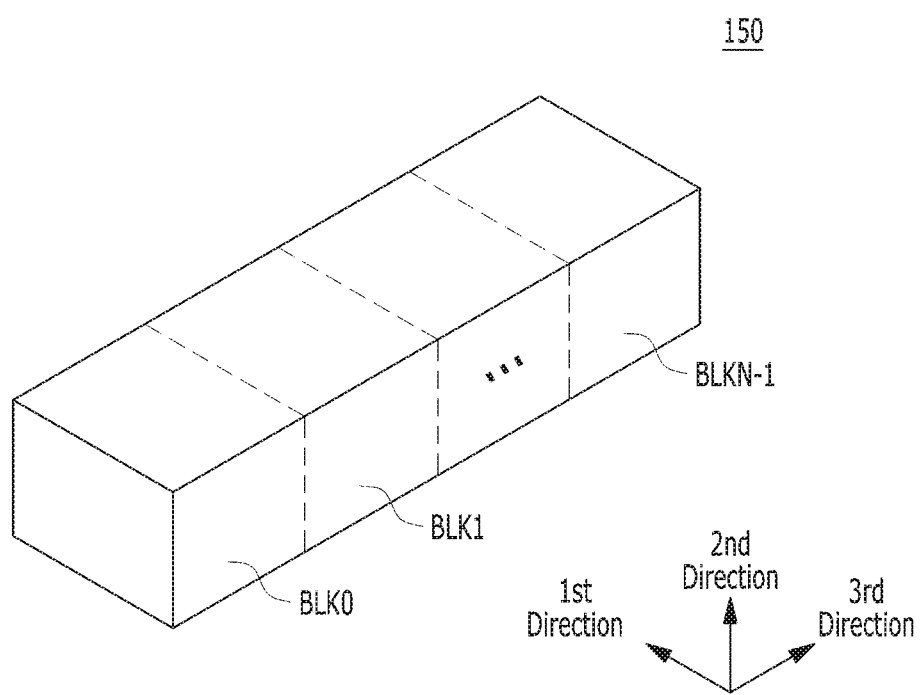
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1, each having a 3D structure (or vertical structure).

Hereinbelow, detailed descriptions will be made with reference to FIGS. 5 to 8 for a data processing operation with respect to the memory device 150 in the memory system in accordance with the embodiment, particularly, a data processing operation in the case of receiving a plurality of commands from the host 102 and performing a plurality of command operations corresponding to the commands.

Figure 5:
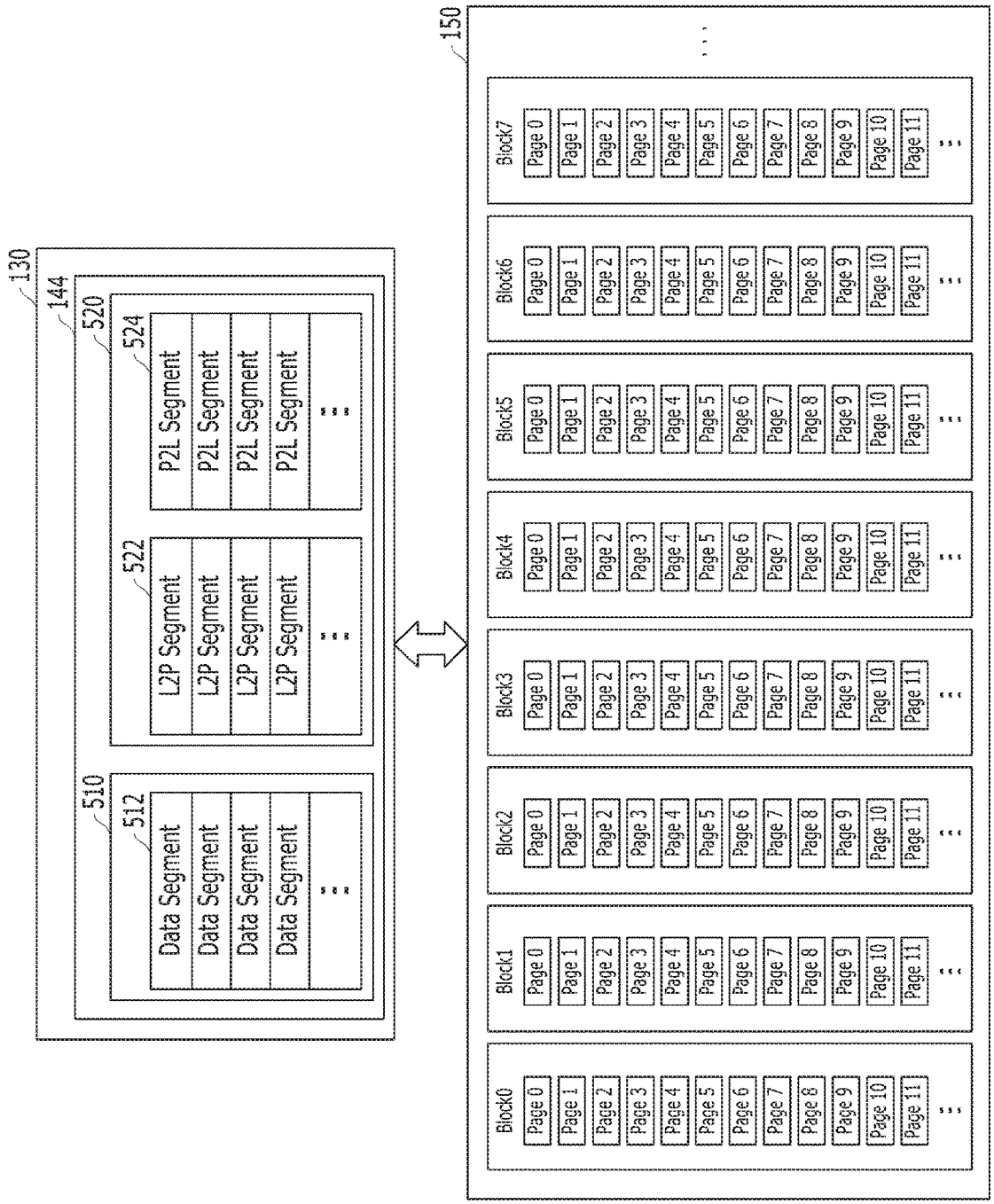
FIGS. 5 to 7 are representations of examples of schematic diagrams to assist in the explanation of an example of a data processing operation in the case where a plurality of command operations corresponding to a plurality of commands are performed in a memory system in accordance with an embodiment.
Figure 6:
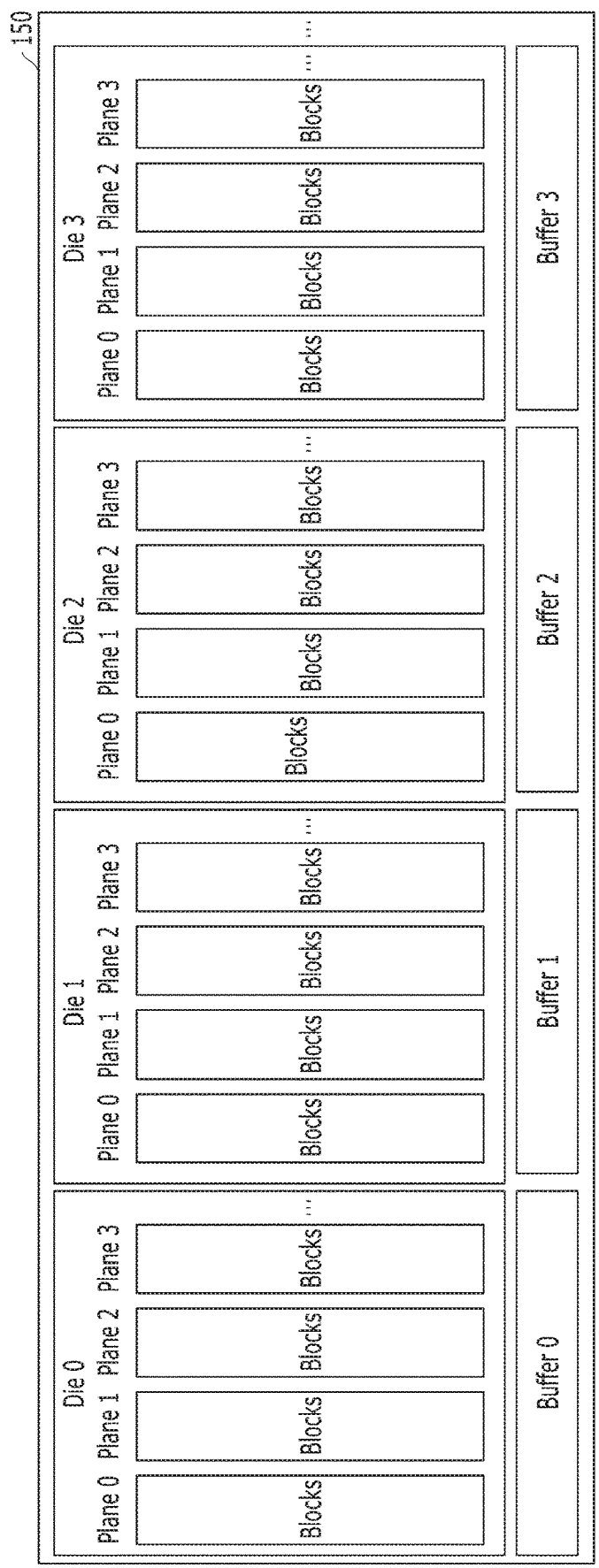
Figure 7:
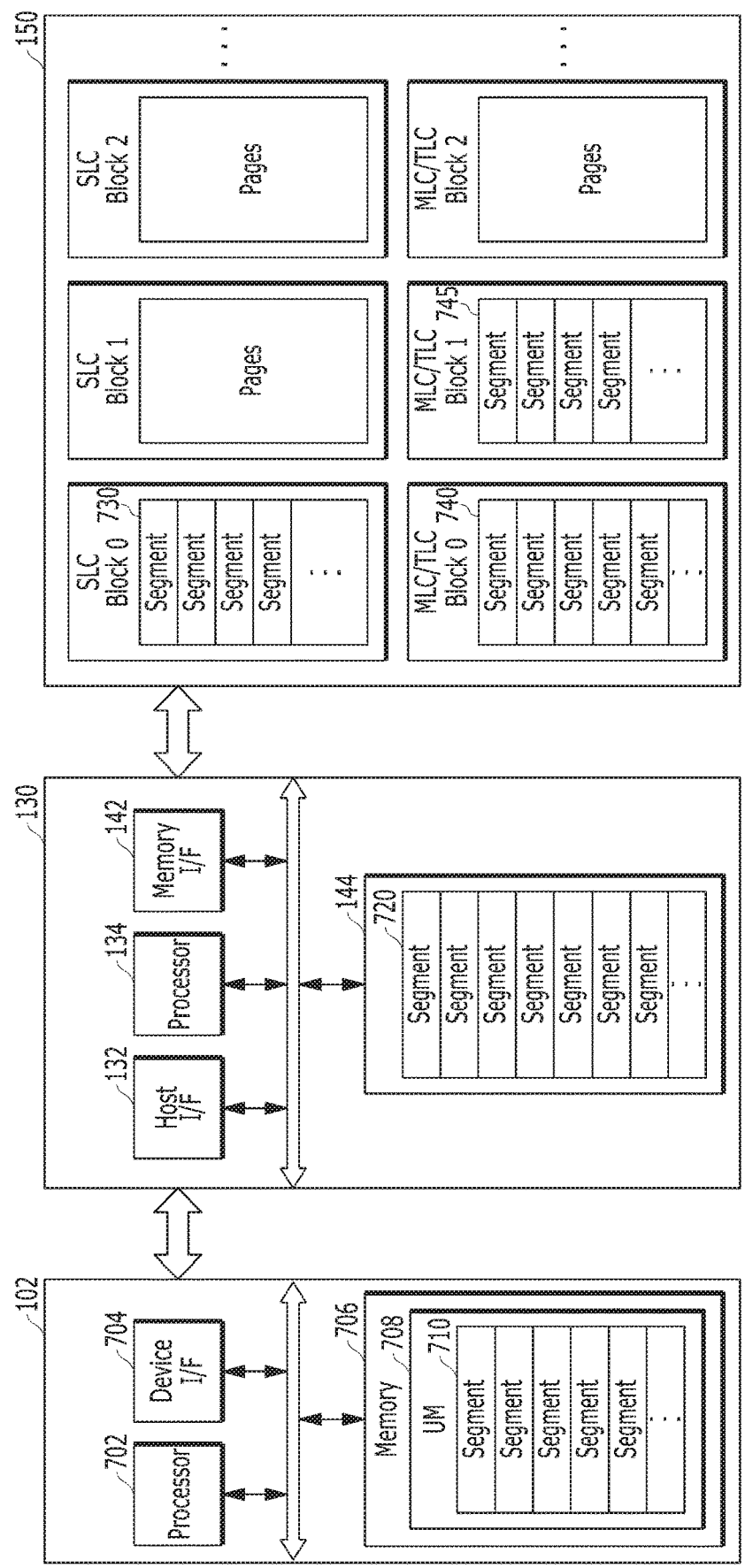

FIGS. 5 to 7 are representations of examples of schematic diagrams to assist in the explanation of an example of a data processing operation in the case where a plurality of command operations corresponding to a plurality of commands are performed in a memory system in accordance with an embodiment. In the embodiment of the disclosure, for the sake of convenience in explanation, detailed descriptions will be made by taking as an example a case where, in the memory system 110 shown in FIG. 1, a plurality of commands are received from the host 102 and command operations corresponding to the commands are performed. For example, in the embodiment of the disclosure, detailed descriptions will be made for a data processing operation in the case where a plurality of write commands are received from the host 102 and program operations corresponding to the write commands are performed, a plurality of read commands are received from the host 102 and read operations corresponding to the read commands are performed, a plurality of erase commands are received from the host 102 and erase operations corresponding to the erase commands are performed or a plurality of write commands and a plurality of read commands are received together from the host 102 and program operations and read operations corresponding to the write commands and the read commands are performed.

Moreover, in the embodiment of the disclosure, descriptions will be made by taking as an example a case where, after a write data corresponding to a plurality of write commands entered from the host 102, is stored in the buffer/cache included in the controller memory 144, the write data stored in the buffer/cache are programmed to and stored in the plurality of memory blocks included in the memory device 150. After a map data in correspondence to the storing of the write data is stored in the plurality of memory blocks, the updated map data are stored in the plurality of memory blocks included in the memory device 150. In the embodiment of the disclosure, descriptions will be made by taking as an example a case where program operations corresponding to a plurality of write commands received from the host 102 are performed. Furthermore, in the embodiment of the disclosure, descriptions will be made by taking as an example a case where, when a plurality of read commands are entered from the host 102 for the data stored in the memory device 150, data corresponding to the read commands are read from the memory device 150 by checking the map data of the data corresponding to the read commands. After the read data is stored in the buffer/cache included in the controller memory 144, the data stored in the buffer/cache are delivered into the host 102. In other words, in the embodiment of the disclosure, descriptions will be made by taking as an example a case where read operations corresponding to a plurality of read commands received from the host 102 are performed. In addition, in the embodiment of the disclosure, descriptions will be made by taking as an example a case where, when a plurality of erase commands are received from the host 102 for the memory blocks included in the memory device 150, after checking memory blocks corresponding to the erase commands, the data stored in the checked memory blocks are erased. After a map data is updated in correspondence to the erased data, the updated map data are stored in the plurality of memory blocks included in the memory device 150. Namely, in the embodiment of the disclosure, descriptions will be made by taking as an example a case where erase operations corresponding to a plurality of erase commands received from the host 102 are performed.

Further, while, in the embodiment, it will be described below as an example for the sake of convenience in explanation that the controller 130 performs command operations in the memory system 110, it is to be noted that, as described above, the processor 134 included in the controller 130 may perform command operations in the memory system 110, through, for example, an FTL (flash translation layer). Also, in the embodiment of the disclosure, the controller 130 programs and stores user data and metadata corresponding to write commands received from the host 102, in arbitrary memory blocks among the plurality of memory blocks included in the memory device 150. The controller 130 reads user data and metadata corresponding to read commands received from the host 102, from arbitrary memory blocks among the plurality of memory blocks included in the memory device 150. The controller 130 provides the read data to the host 102, or erases user data and metadata corresponding to erase commands received from the host 102, from arbitrary memory blocks among the plurality of memory blocks included in the memory device 150.

Metadata may include a first map data including a logical/physical (L2P: logical to physical) information (hereinafter, referred to as a 'logical information') and a second map data including a physical/logical (P2L: physical to logical) information (hereinafter, referred to as a 'physical information'), for data stored in memory blocks in correspondence to a program operation. Also, the metadata may include an information on command data corresponding to a command received from the host 102, an information on a command operation corresponding to the command, an information on the memory blocks of the memory device 150 for which the command operation is to be performed, and an information on map data corresponding to the command operation. In other words, metadata may include all remaining informations and data excluding user data corresponding to a command received from the host 102.

In the embodiment of the disclosure, in the case where the controller 130 receives a plurality of write commands from the host 102, program operations corresponding to the write commands are performed. User data corresponding to the write commands are written and stored in empty memory blocks, open memory blocks or free memory blocks for which an erase operation has been performed, among the memory blocks of the memory device 150. Also, the first map data, including an L2P map table or an L2P map list in which logical informations as the mapping informations between logical addresses and physical addresses for the user data stored in the memory blocks are recorded. The second map data, including a P2L map table or a P2L map list in which physical informations as the mapping informations between physical addresses and logical addresses for the memory blocks stored with the user data are recorded, are written and stored in empty memory blocks, open memory blocks or free memory blocks among the memory blocks of the memory device 150.

Here, in the case where write commands are received from the host 102, the controller 130 writes and stores user data corresponding to the write commands in memory blocks. The controller 130 stores, in memory blocks, metadata including a first map data and a second map data for the user data stored in the memory blocks. In correspondence to that the user data segments are stored in the memory blocks of the memory device 150, the controller 130 generates and updates the L2P segments of the first map data and the P2L segments of the second map data as the map segments of map data among the meta segments of metadata. Then, the controller 130 stores them in the memory blocks of the memory device 150. The map segments stored in the memory blocks of the memory device 150 are loaded in the memory 144 included in the controller 130. Then, the map segments can be updated.

Further, in the case where a plurality of read commands are received from the host 102, the controller 130 reads read data corresponding to the read commands, from the memory device 150, stores the read data in the buffers/caches included in the memory 144 inside the controller 130. Then, the controller 130 provides the data stored in the buffers/caches, to the host 102, by which read operations corresponding to the plurality of read commands are performed.

In addition, in the case where a plurality of erase commands are received from the host 102, the controller 130 checks memory blocks of the memory device 150 corresponding to the erase commands. Then, the controller 130 performs erase operations for the memory blocks. Hereinbelow, a data processing operation in the memory system in accordance with the embodiment of the disclosure will be described in detail with reference to FIGS. 5 to 7.

First, referring to FIG. 5, the controller 130 performs command operations corresponding to a plurality of commands received from the host 102, for example, program operations corresponding to a plurality of write commands received from the host 102. For example, the controller 130 programs and stores user data corresponding to the write commands, in memory blocks of the memory device 150. Also, in correspondence to the program operations with respect to the memory blocks, the controller 130 generates and updates metadata for the user data to store the metadata in the memory blocks of the memory device 150.

The controller 130 generates and updates a first map data and a second map data which include informations indicating that the user data are stored in pages included in the memory blocks of the memory device 150. The controller 130 generates and updates L2P segments as the logical segments of the first map data and P2L segments as the physical segments of the second map data. Then, the controller 130 stores them in pages included in the memory blocks of the memory device 150.

By the way of example but not limitation, the controller 130 caches and buffers the user data corresponding to the write commands received from the host 102, in a first buffer 510 included in the controller memory 144. In particular, after storing data segments 512 of the user data in the first buffer 510 as a data buffer/cache, the controller 130 stores the data segments 512 stored in the first buffer 510, in pages included in the memory blocks of the memory device 150. As the data segments 512 of the user data corresponding to the write commands received from the host 102 are programmed to and stored in the pages included in the memory blocks of the memory device 150, the controller 130 generates and updates the first map data and the second map data. The controller 130 stores them in a second buffer 520 included in the controller memory 144. Particularly, the controller 130 stores L2P segments 522 of the first map data and P2L segments 524 of the second map data for the user data, in the second buffer 520 as a map buffer/cache. In the second buffer 520 in the controller memory 144, there may be stored, as described above, the L2P segments 522 of the first map data and the P2L segments 524 of the second map data. There may be stored a map list for the L2P segments 522 of the first map data and a map list for the P2L segments 524 of the second map data. The controller 130 stores the L2P segments 522 of the first map data and the P2L segments 524 of the second map data which are stored in the second buffer 520, in pages included in the memory blocks of the memory device 150.

Also, the controller 130 performs command operations corresponding to a plurality of commands received from the host 102, for example, read operations corresponding to a plurality of read commands received from the host 102. The controller 130 loads L2P segments 522 of the first map data and P2L segments 524 of the second map data as the map segments of user data corresponding to the read commands, in the second buffer 520, and checks the L2P segments 522 and the P2L segments 524. After that, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands received from the host 102, for example, erase operations corresponding to a plurality of erase commands received from the host 102. The controller 130 checks memory blocks corresponding to the erase commands among the memory blocks of the memory device 150. The controller 130 performs the erase operations for the checked memory blocks.

In the case of performing, as a background operation, an operation of copying data or swapping data among the memory blocks included in the memory device 150, for example, a garbage collection operation or a wear leveling operation, the controller 130 stores data segments 512 of corresponding user data, in the first buffer 510, loads map segments 522, 524 of map data corresponding to the user data, in the second buffer 520, and then performs the garbage collection operation or the wear leveling operation.

Further, in the case of storing data corresponding to write commands received from the host 102, in the memory blocks of the memory device 150, the controller 130 stores the data in corresponding memory blocks among the memory blocks, in correspondence to data sizes and data types. By the way of example but not limitation, in the case where a plurality of memory blocks included in the memory device 150 are SLC memory blocks, MLC memory blocks, TLC memory blocks, QLC memory blocks or memory blocks capable of storing more-bit data, the controller 130 stores the data corresponding to the write commands, in respective corresponding memory blocks. In this regard, in the embodiment of the disclosure, for the sake of convenience in explanation, detailed descriptions will be made by taking as an example a case where the controller 130 stores data corresponding to write commands in SLC memory blocks as memory blocks capable of storing single bit data or MLC/TLC memory blocks as memory blocks capable of storing multi-bit data.

Also, the controller 130 performs a data migration operation for the data stored in SLC memory blocks among the memory blocks of the memory device 150. After performing a data merge operation for the data stored in SLC memory blocks by using the memory included in the host 102, the controller 130 stores merged data in MLC/TLC memory blocks, by which the data stored in the SLC memory blocks are migrated to the MLC/TLC memory blocks. In this regard, after checking the data size and the data type of data corresponding to the write commands received from the host 102, in the case where the data size is smaller than a threshold value or the data type is a first type, the data are stored in SLC memory blocks. Data of the first type may be hot data, short term data or random data or may be data having a high level in terms of locality, reliability, value, priority or accessibility. After checking the data size and the data type of data corresponding to the write commands received from the host 102, in the case where the data size is equal to or larger than the threshold value or the data type is a second type, the data are stored in MLC/TLC memory blocks. Data of the second type may be cold data, long term data or sequential data or may be data having a low level in terms of locality, reliability, value, priority or accessibility.

In other words, the controller 130 stores data corresponding to the write commands received from the host 102, in the SLC memory blocks of the memory device 150, in correspondence to a data size and a data type, merges the data stored in the SLC memory blocks by using the memory included in the host 102, and stores the data merged in the memory of the host 102, in the MLC/TLC memory blocks of the memory device 150, thereby migrating the data stored in the SLC memory blocks of the memory device 150, to the MLC/TLC memory blocks of the memory device 150.

Referring to FIG. 6, the memory device 150 includes a plurality of memory dies, for example, a memory die 0, a memory die 1, a memory die 2 and a memory die 3, and each of the memory dies may include a plurality of planes, for example, a plane 0, a plane 1, a plane 2 and a plane 3. The respective planes in the memory dies included in the memory device 150 include a plurality of memory blocks, for example, N number of blocks Block0, Block1, . . . , BlockN−1 each including a plurality of pages, for example, 2^M number of pages, as described above with reference to FIG. 2. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. By the way of example but not limitation, in a case of performing program operations, data corresponding to the program operations are stored in the buffers. The data are then stored in the pages included in the memory blocks of the memory dies. In a case of performing read operations, data corresponding to the read operations are read from the pages included in the memory blocks of the memory dies. The data are stored in the buffers, and are then provided to the host 102 through the controller 130.

In the embodiment of the disclosure, while it will be described below as an example for the sake of convenience in explanation that the buffers included in the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, in the embodiment of the disclosure, while it will be described below as an example for the sake of convenience in explanation that the buffers included in the memory device 150 are the plurality of page buffers 322, 324, 326 included in the memory device 150 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die or be included in the planes of a second memory die. Hereinbelow, an example with reference to FIG. 7 may provide detailed descriptions for the performing of program operations corresponding to a plurality of write commands received from the host 102, in the plurality of memory blocks included in the memory device 150, and for the performing of a data merge operation and a data migration operation for data stored in arbitrary memory blocks, as described above, in the memory system in accordance with the embodiment of the present disclosure.

Referring to FIG. 7, in the case where the controller 130 receives a plurality of commands, for example, a plurality of write commands, a plurality of read commands and/or a plurality of erase commands, from the host 102, the controller 130 performs command operations corresponding to the plurality of commands received from the host 102, for example, program operations, read operations and erase operations, in the plurality of memory blocks included in the memory device 150. The controller 130 performs program operations corresponding to the plurality of write commands received from the host 102, in the plurality of memory blocks included in the memory device 150. When performing the program operations, the controller 130 stores data corresponding to the write commands in SLC memory blocks or MLC/TLC memory blocks among the memory blocks of the memory device 150, in correspondence to their data sizes and data types.

In detail, in the case where the controller 130 receives a plurality of write commands from the host 102, the controller 130 checks the size and type of the data corresponding to the write commands. The data corresponding to the write commands may include user data and metadata. The controller 130 then stores segments 720 of the data (data segments) corresponding to the write commands, in the controller memory 144. The data segments may be user data segments and/or metadata segments. In the case where the data segments 720 are user data segments, data segments 720 are stored in the first buffer 510 included in the memory 144. In the case where the data segments 720 are metadata segments, the data segments 720 are stored in the second buffer 520 included in the memory 144. While detailed descriptions will be made in the described embodiment for the sake of convenience in explanation by taking as an example a case where the data segments 720 corresponding to the plurality of write commands received from the host 102 are user data segments, it is to be noted that the disclosure may be applied equally also in the case where data segments 720 are the metadata segments.

The controller 130 may then store the data segments 720 which are stored in the controller memory 144, in SLC memory blocks, for example, an SLC memory block 0, an SLC memory block 1 and an SLC memory block 2, or in MLC/TLC memory blocks, for example, an MLC/TLC memory block 0, an MLC/TLC memory block 1 and an MLC/TLC memory block 2, among the plurality of memory blocks included in the memory device 150, in correspondence to the data size and types. As described above, the memory device 150 includes the SLC memory blocks which are memory blocks having memory cells capable of storing single bit data and the MLC/TLC memory blocks which are memory blocks having memory cells capable of storing multi-bit data.

In other words, in the case where the size of the data corresponding to the plurality of write commands received from the host 102 are equal to or larger than a threshold value, the controller 130 stores data segments 720 stored in the controller memory 144, in the MLC/TLC memory blocks, for instance, the MLC/TLC memory block 0. While descriptions are made in the embodiment of the disclosure for the sake of convenience in explanation by taking as an example a case where the controller 130 stores data segments in one MLC/TLC memory block, it is to be noted that the disclosure may be applied even in the case where data segments are stored in a plurality of MLC/TLC memory blocks. In some embodiments, a plurality of MLC/TLC memory blocks may be grouped to form MLC/TLC super memory blocks as described above with reference to FIG. 6. The controller 130 stores the data corresponding to the plurality of write commands received from the host 102, in the MLC/TLC memory blocks of the memory device 150, by an MLC/TLC one-shot write unit size. Accordingly, data segments 720 stored in the controller memory 144 are stored in the MLC/TLC memory block 0 by the MLC/TLC one-shot write unit size. In the case where the MLC/TLC one-shot write unit size is, for instance, 64K, data segments 720 stored in the controller memory 144 are stored in the pages included in the MLC/TLC memory block 0 by the unit size of 64K. Accordingly, as segments 740 of the MLC/TLC memory block 0, data segments 720 stored in the controller memory 144 are respectively stored by the unit size of 64K. The MLC/TLC one-shot write unit size in the case where data are stored in the MLC/TLC memory blocks of the memory device 150 corresponds to a multiple of an SLC one-shot write unit size in the case where data are stored in the SLC memory blocks of the memory device 150.

In the case where the size of the data corresponding to the plurality of write commands received from the host 102 is smaller than the threshold value, the controller 130 stores data segments 720 stored in the controller memory 144, in the SLC memory blocks, for instance, the SLC memory block 0. While descriptions are made in the embodiment of the disclosure for the sake of convenience in explanation by taking as an example a case where the controller 130 stores segments in one SLC memory block, it is to be noted that the present disclosure may be applied even in the case where segments are stored in a plurality of SLC memory blocks, in particular, SLC super memory blocks in which a plurality of SLC memory blocks are grouped as described above with reference to FIG. 6. The controller 130 stores the data corresponding to the plurality of write commands received from the host 102, in the SLC memory blocks of the memory device 150, by the SLC one-shot write unit size. Accordingly, data segments 720 stored in the controller memory 144 are stored in the SLC memory block 0 by the SLC one-shot write unit size. In the case where the SLC one-shot write unit size is, for instance, 16K, data segments 720 stored in the controller memory 144 are stored in the pages included in the SLC memory block 0 by the unit size of 16K. Accordingly, as segments 730 of the SLC memory block 0, data segments 720 stored in the controller memory 144 are respectively stored by the unit size of 16K.

The controller 130 stores data segments 720 stored in the controller memory 144, in the SLC memory blocks or the MLC/TLC memory blocks by a corresponding one-shot write unit size, and a threshold value is determined in correspondence to the corresponding one-shot write unit size. When storing data in the MLC/TLC memory blocks, the controller 130 determines a threshold value in correspondence to the MLC/TLC one-shot write unit size. For instance, in the case where the size of the data corresponding to the plurality of write commands received from the host 102 is smaller than the MLC/TLC one-shot write unit size, the controller 130 stores data segments 720 stored in the controller memory 144, in the SLC memory blocks. In the case where data sizes corresponding to data segments 720 stored in the controller memory 144 is smaller than the MLC/TLC one-shot write unit size, the controller 130 stores data segments 720 stored in the memory 44 of the controller 130, in the SLC memory blocks.

In a case where the controller 130 copies or moves data segments 720, stored in the controller memory 144, to the SLC memory block 0 of the memory device 150, the controller 130 delivers data segments 720, stored in the controller memory 144, into a memory 706 included in the host 102, such as a unified memory (UM) 708 in the host memory 706.

The host 102 includes a processor 702 (host processor), the host memory 706 (host memory) and a device interface unit 704. The host processor 702 controls the general operations of the host 102. The host processor 702 controls commands corresponding to user requests, to be transmitted to the controller 130 of the memory system 110, such that command operations corresponding to the user requests are performed in the memory system 110. The host processor 702 may be embodied by a microprocessor or a central processing unit (CPU).

The host memory 706 is the main memory or the system memory of the host 102. The host memory 706 stores data for the driving of the host 102. The host memory 706 may include a host use memory region and a device use memory region. In the host use memory region are stored data used in the host 102, while in device use memory region are stored data used in the memory system 110. In the host use memory region as a system memory region in the host memory 706, there are stored data or program informations on the system of the host 102, for example, a file system or an operating system. In the UM 708 as the device use memory region in the host memory 706, there are stored data or informations in the memory system 110 in the case where the memory system 110 performs command operations corresponding to the commands received from the host 102, that is, foreground operations or background operations. The host memory 706 may be embodied by a volatile memory, for example, a static random-access memory (SRAM) or a dynamic random-access memory (DRAM). The UM 708, as the device use memory region, in the host memory 706 is allocated and reported to the memory system 110 when performing a booting operation after the memory system 110 is converted from a power-off state into a power-on state.

The device interface unit 704 of the host 102, as a host controller interface (HCI), processes the commands and data of the host 102, and may be configured to communicate with the memory system 110 under at least one of various interface protocols such as USB (universal serial bus), MMC (multimedia card), PCI-E (peripheral component interconnection-express), SAS (serial-attached SCSI), SATA (serial advanced technology attachment), PATA (parallel advanced technology attachment), SCSI (small computer system interface), ESDI (enhanced small disk interface), IDE (integrated drive electronics) and MIPI (mobile industry processor interface).

In a case where the controller 130 copies data segments 720, stored in the controller memory 144, to the SLC memory block 0 of the memory device 150 based on the data sizes and data types of the data corresponding to the write commands entered from the host 102, the controller 130 delivers data segments 720, stored in the controller memory 144, into the UM 708 of the host memory 706. In the case where the data size is smaller than the threshold value, the controller 130 copies data segments 720, stored in the controller memory 144, to the SLC memory block 0 by the SLC one-shot write unit size. The controller 130 stores data segments 720, stored in the SLC memory block 0, in the UM 708 of the host memory 706 by the SLC one-shot write unit size. Therefore, the segments 730 included in the SLC memory block 0 of the memory device 150 are also stored in the UM 708. As the segments 730 are stored in the SLC memory block 0 by the SLC one-shot write unit size, the controller 130 stores segments 710 in the UM 708 by the SLC one-shot write unit size. Namely, the controller 130 stores or copies data segments 720, which are stored in the controller memory 144, into the SLC memory block 0 of the memory device 150 and the UM 708 of the host 102 by the SLC one-shot write unit size.

The controller 130 merges the segments 710 stored in the UM 708 of the host 102. The controller 130 merges the segments 710 stored in the UM 708 of the host 102 in such a way as to be stored in the memory blocks of the memory device 150 by the MLC/TLC one-shot write unit size. The controller 130 performs the data merge operation by using the UM 708 of the host 102, for the segments 730 stored in the SLC memory block 0 by the SLC one-shot write unit size. The controller 130 merges the segments 710 stored in the UM 708 of the host 102, by the MLC/TLC one-shot write unit size, such that the segments 730 stored in the SLC memory block 0 by the SLC one-shot write unit size are stored in the MLC/TLC memory blocks of the memory device 150 by the MLC/TLC one-shot write unit size.

The controller 130 stores the segments 710 which are merged in the UM 708 of the host 102 by the MLC/TLC one-shot write unit size, in the MLC/TLC memory blocks of the memory device 150, for instance, the MLC/TLC memory block 1. While descriptions are made in the embodiment of the disclosure for the sake of convenience in explanation by taking as an example a case where the segments 710 merged in the UM 708 of the host 102 by the MLC/TLC one-shot write unit size and data segments 720 stored in the controller memory 144 are stored in different MLC/TLC memory blocks, it is to be noted that the disclosure may be applied even in the case where the segments 710, 720 are stored in the same MLC/TLC memory block.

The controller 130 performs a data migration operation for the segments 730 stored in the SLC memory block 0 of the memory device 150. The controller 130 stores or copies the segments 730, which are stored in the SLC memory block 0 of the memory device 150, into the MLC/TLC memory block 1 by the MLC/TLC one-shot write unit size. After storing segments 745 in the MLC/TLC memory block 1, the controller 130 performs an erase operation for the SLC memory block 0 of the memory device 150. The controller 130 erases the segments 730 stored in the SLC memory block 0. Also, the controller 130 discards the segments 710 merged in the UM 708 of the host 102 by the MLC/TLC one-shot write unit size. The controller 130 migrates the segments 730, stored in the SLC memory block 0 of the memory device 150, into the MLC/TLC memory block 1 of the memory device 150 by using the UM 708 of the host 102, without performing access and read operations for the segments 730 stored in the SLC memory block 0 of the memory device 150, whereby it is possible to improve the operational performance of the memory system 110.

In a case where a power-off occurs in the memory system 110 and the host 102 while the controller 130 performs the data merge operation for the segments 730 stored in the SLC memory block 0 of the memory device 150, the host memory 706 is initialized in the UM 708 of the host 102 through the segments 710 stored in the UM 708 of the host 102. Accordingly, the segments 710 stored in the UM 708 of the host 102 do not exist in the UM 708 of the host 102. Specifically, in the case where a sudden power-off occurs in the memory system 110 and the host 102 while the controller 130 performs the data merge operation for the segments 730, stored in the SLC memory block 0 of the memory device 150, the host memory 706 and the controller memory 144 are initialized in the UM 708 of the host 102. Accordingly, the segments 710, 720 do not exist in not only the UM 708 of the host 102 but also the controller memory 144.

In the case where the memory system 110 and the host 102 are powered on again, the controller 130 performs booting and recovery operations. In a case where a power-off occurs in the memory system 110 and the host 102 while performing the data merge operation in the UM 708 of the host 102 and then the memory system 110 and the host 102 are powered on again, the controller 130 loads the segments 730, stored in the SLC memory block 0 of the memory device 150, in the UM 708 in the host memory 706. The controller 130 merges the segments 710 loaded in the UM 708 of the host 102. The controller 130 merges the segments 710 stored in the UM 708 of the host 102 in such a way as to be stored in the memory blocks of the memory device 150 by the MLC/TLC one-shot write unit size. The controller 130 stores the segments 710 which are merged in the UM 708 of the host 102 by the MLC/TLC one-shot write unit size, in the MLC/TLC memory blocks, for instance, the MLC/TLC memory block 1, of the memory device 150. After storing segments 745 in the MLC/TLC memory block 1, the controller 130 performs an erase operation for the SLC memory block 0 of the memory device 150. The controller 130 erases the segments 730 stored in the SLC memory block 0. Also, the controller 130 discards the segments 710 merged in the UM 708 of the host 102 by the MLC/TLC one-shot write unit size. As a consequence, even if a power-off occurs in the memory system 110 and the host 102 while performing the data merge operation by using the UM 708 of the host 102, the controller 130 may stably perform a recovery operation and a data migration operation in correspondence to the occurrence of the power-off in the memory system 110 and the host 102, by loading the segments 710 for which the data merge operation is to be performed in the UM 708 of the host 102, from the SLC memory block 0 of the memory device 150.

To efficiently use the plurality of memory blocks included in the memory device 150 or improve the operational performance of the memory system 110, the controller 130 performs a data migration operation for the plurality of memory blocks included in the memory device 150. After checking parameters for SLC memory blocks among the memory blocks of the memory device 150, the controller 130 selects optional SLC memory blocks in correspondence to the parameters of the respective SLC memory blocks. The controller 130 loads the segments stored in the optional SLC memory blocks, in the UM 708 in the host memory 706. The controller 130 merges the segments 710 loaded in the UM 708 of the host 102. The controller 130 merges the segments 710 stored in the UM 708 of the host 102 in such a way as to be stored in the memory blocks of the memory device 150 by the MLC/TLC one-shot write unit size.

The controller 130 stores the segments 710 which are merged in the UM 708 of the host 102 by the MLC/TLC one-shot write unit size, in the MLC/TLC memory blocks of the memory device 150. After storing segments 745 in the MLC/TLC memory blocks, the controller 130 performs an erase operation for the optional SLC memory blocks of the memory device 150, thereby erasing the segments stored in the optional SLC memory blocks. Also, the controller 130 discards the segments 710 merged in the UM 708 of the host 102 by the MLC/TLC one-shot write unit size.

The controller 130 checks count parameters or cycle parameters corresponding to the performing of command operations in the respective SLC memory blocks, as the parameters for the SLC memory blocks of the memory device 150. For instance, after checking valid page counts (VPCs) in the respective SLC memory blocks of the memory device 150, the controller 130 selects optional SLC memory blocks among the SLC memory blocks of the memory device 150 in correspondence to the valid page counts. After loading the segments of the valid data stored in valid pages in the optional SLC memory blocks, in the UM 708 of the host 102, the controller 130 merges the segments by the MLC/TLC one-shot write unit size. The controller 130 stores the segments 710 merged in the UM 708 of the host 102 by the MLC/TLC one-shot write unit size, in the MLC/TLC memory blocks of the memory device 150. The controller 130 erases the segments stored in the optional SLC memory blocks by performing an erase operation for the optional SLC memory blocks of the memory device 150. The controller 130 discards the segments 710 merged in the UM 708 of the host 102 by the MLC/TLC one-shot write unit size.

Also, the controller 130 checks the data types of the segments stored in the respective SLC memory blocks, as the parameters for the SLC memory blocks of the memory device 150. For instance, the controller 130 selects SLC memory blocks whose data types of the segments stored therein are the second type, among the SLC memory blocks of the memory device 150. The data types of the segments stored in SLC memory blocks may be changed in correspondence to the aging of and access to the SLC memory blocks or the segments. Namely, while the data types of the segments stored in SLC memory blocks may be the first type at an initial stage where the controller 130 stores data in the SLC memory blocks, the data types of the segments stored in the SLC memory blocks may be changed to the second type depending on aging and access. The segments stored in SLC memory blocks are changed from segments as hot data, short term data or random data or data having a high level in terms of locality, reliability, value, priority or accessibility into segments as cold data, long term data or sequential data or data having a low level in terms of locality, reliability, value, priority or accessibility.

After loading segments as the second type data stored in optional SLC memory blocks, in the UM 708 of the host 102, the controller 130 merges the segments by the MLC/TLC one-shot write unit size. The controller 130 stores the segments 710 merged in the UM 708 of the host 102 by the MLC/TLC one-shot write unit size, in the MLC/TLC memory blocks of the memory device 150. The controller 130 erases the segments stored in the optional SLC memory blocks by performing an erase operation for the optional SLC memory blocks of the memory device 150. The controller 130 discards the segments 710 merged in the UM 708 of the host 102 by the MLC/TLC one-shot write unit size.

In the memory system in accordance with the embodiment of the disclosure, when data, corresponding to the write commands entered from the host 102, are stored in the memory blocks of the memory device 150, the data are stored in corresponding memory blocks among the memory blocks of the memory device 150 by one-shot write unit size based on both the data sizes and the data types of the corresponding data. Data may be stably and reliably stored in the memory device 150 in correspondence to the flush commands entered from the host 102 for the write commands. Also, by performing a data merge operation and a data migration operation through the memory included in the host 102, the utilization efficiency of the memory device 150 may be enhanced. The operational performance of the memory system may be improved or enhanced. Hereinbelow, an operation for processing data in a memory system in accordance with an embodiment of the disclosure will be described in detail with reference to FIG. 8.

Figure 8:
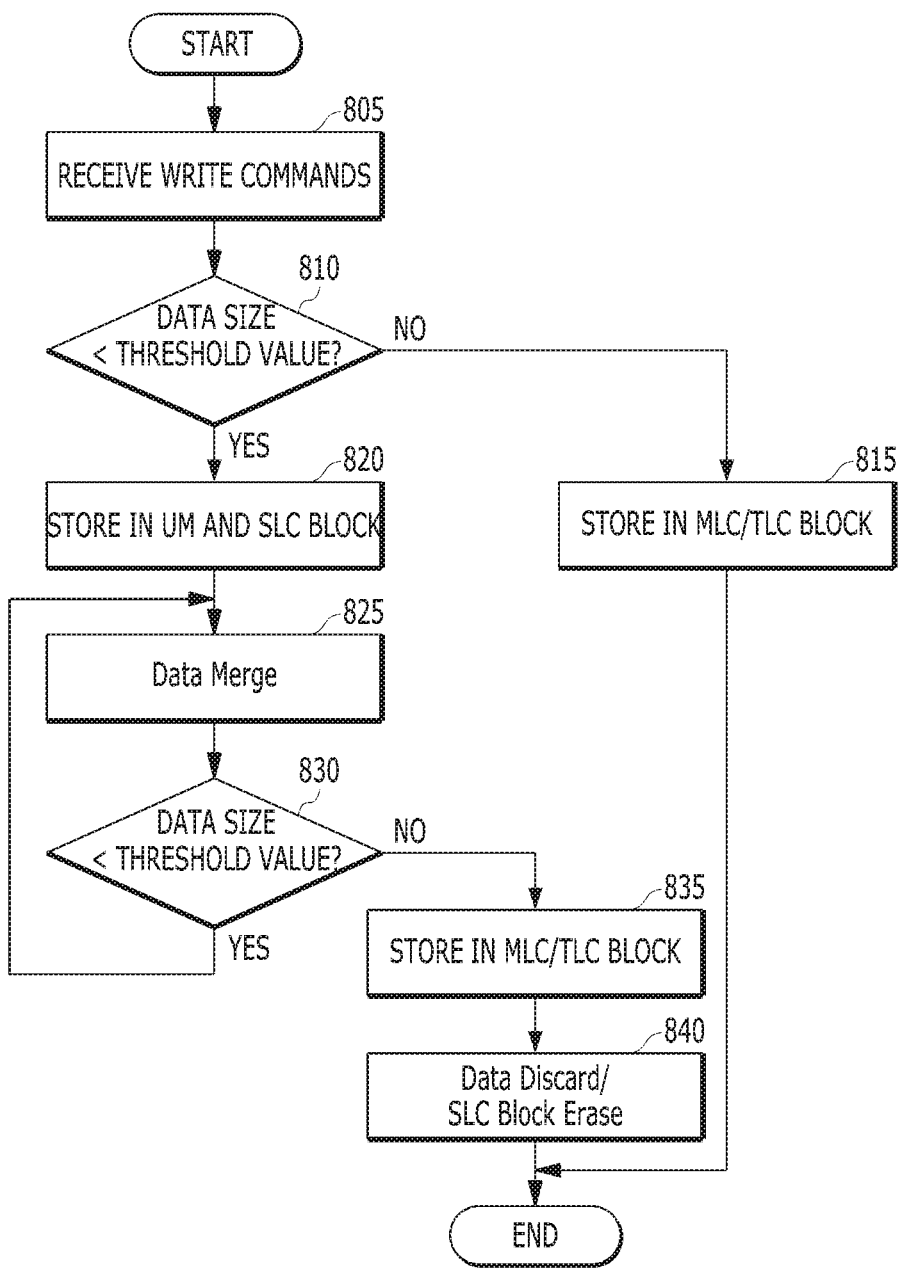
FIG. 8 is a flowchart of an operation process for processing data in a memory system in accordance with an embodiment.

FIG. 8 is a flowchart of an operation process for processing data in a memory system in accordance with an embodiment.

Referring to FIG. 8, at step 805, the memory system 110 receives a plurality of commands, e.g., a plurality of write commands, from the host 102.

At step 810, the segments of data corresponding to the plurality of write commands are stored in the controller memory 144. When the data size of the data segments which are stored in the controller memory 144 becomes equal to or larger than a threshold value, at step 815, the data segments are stored in the MLC/TLC memory blocks of the memory device 150 by an MLC/TLC one-shot write unit size. If the data size of the segments which are stored in the controller memory 144, is smaller than the threshold value, at step 820, the data segments stored in the controller memory 144 are stored in the SLC memory blocks of the memory device 150 and the UM 708 in the host memory 706 by an SLC one-shot write unit size.

In this regard, depending on not only the size but also the type of the segments stored in the controller memory 144, the segments stored in the controller memory 144 may be stored either in the MLC/TLC memory blocks of the memory device 150 or in the SLC memory blocks of the memory device 150 and the UM 708 of the host 102.

At step 825, the segments stored in the UM 708 of the host 102 are merged. The segments stored in the UM 708 of the host 102 are merged by the MLC/TLC one-shot write unit size such that the segments stored in the UM 708 of the host 102 are stored in the MLC/TLC memory blocks of the memory device 150 by the MLC/TLC one-shot write unit size.

In the case where, at step 830, the data sizes of the segments merged in the UM 708 of the host 102 are equal to or larger than the threshold value, at step 835, the segments merged in the UM 708 of the host 102 are stored in the MLC/TLC memory blocks of the memory device 150 by the MLC/TLC one-shot write unit size. A data merge operation for the segments stored in the SLC memory blocks of the memory device 150 is performed at the step 825. A data migration operation for the segments stored in the SLC memory blocks of the memory device 150 is performed at the step 835. In the case where the data sizes of the segments merged in the UM 708 of the host 102 is smaller than the threshold value, at the step 825, the segments stored in the UM 708 of the host 102 are merged.

At step 840, the segments stored in the SLC memory blocks of the memory device 150 are erased by performing an erase operation for the SLC memory blocks of the memory device 150. The segments stored and merged in the UM 708 of the host 102 are discarded.

Since detailed descriptions were made above with reference to FIGS. 5 to 7, regarding operations of storing data corresponding to a plurality of write commands received from the host 102, in corresponding memory blocks among the memory blocks of the memory device 150, and performing of a data merge operation and a data migration operation for the data stored in respective memory blocks by using the host memory 706, further descriptions thereof will be omitted herein. Hereinbelow, detailed descriptions will be made with reference to FIGS. 9 to 17, regarding a data processing system and electronic appliances to which the memory system 110 including the memory device 150 and the controller 130 described above with reference to FIGS. 1 to 8, in accordance with the embodiment of the disclosure, is applied.

FIGS. 9 to 17 are diagrams schematically illustrating application examples of the data processing system of FIG. 1.

Figure 9:
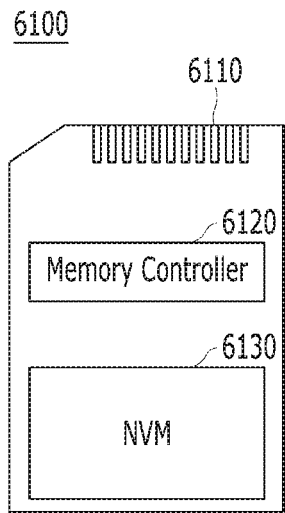
FIGS. 9 to 17 are diagrams schematically illustrating application examples of the data processing system shown in FIG. 1 in accordance with various embodiments of the present invention.

FIG. 9 is a diagram schematically illustrating another example of the data processing system including the memory system in accordance with the present embodiment. FIG. 9 schematically illustrates a memory card system to which the memory system in accordance with the embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory. The memory controller 6120 may be configured to access the memory device 6130. By the way of example but not limitation, the memory controller 6120 may be configured to control read, write, erase and background operations of the memory device 6130. The memory controller 6120 may be configured to provide an interface between the memory device 6130 and a host, and to use a firmware for controlling the memory device 6130. That is, the memory controller 6120 may correspond to the controller 130 of the memory system 110 described with reference to FIGS. 1 and 7. The memory device 6130 may correspond to the memory device 150 of the memory system 110 described with reference to FIGS. 1 and 7.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. By the way of example but not limitation, as described with reference to FIG. 1, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. By the way of example but not limitation, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
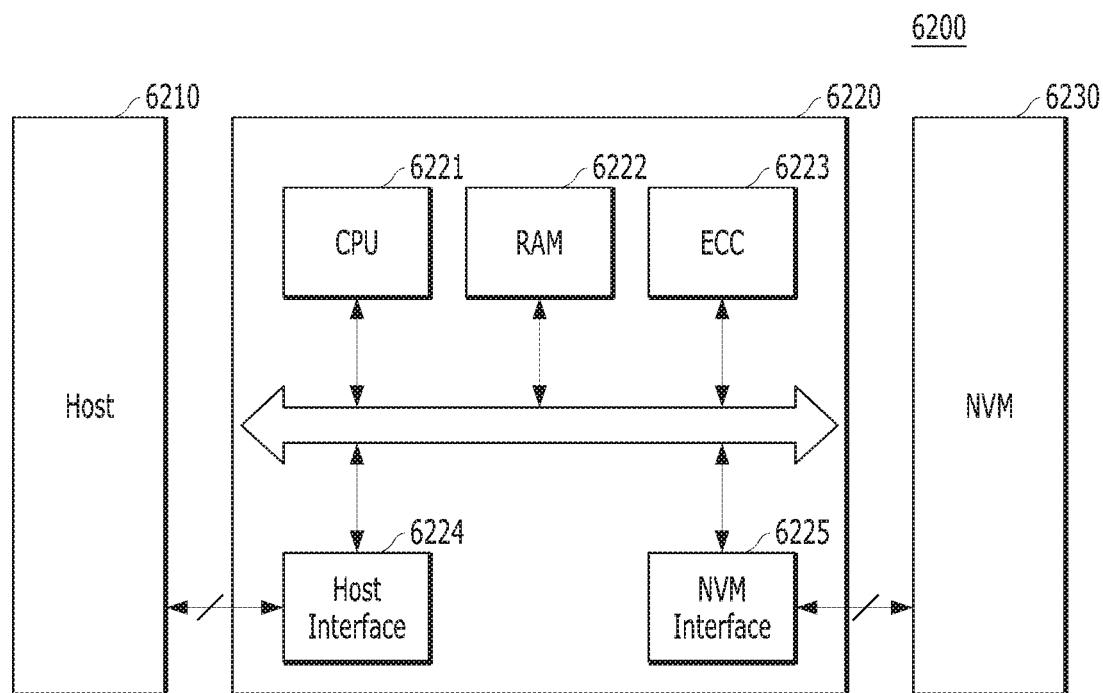

FIG. 10 is a diagram schematically illustrating another example of the data processing system including the memory system in accordance with the embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 7, and the memory controller 6220 may correspond to the controller 130 in the memory system 110 illustrated in FIGS. 1 and 7.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or an error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. For example, the ECC circuit 6223 may correct an error using the parity bit. For example, as described with reference to FIG. 1, the ECC circuit 6223 may correct an error using the LDPC code, the BCH code, the turbo code, the Reed-Solomon code, the convolution code, the RSC or a coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, a SATA bus, a SCSI, a USB, a PCIe or a NAND interface. The memory controller 6220 may have a wireless communication function with a mobile communication protocol such as a WiFi or a Long-Term Evolution (LTE). The memory controller 6220 may be connected to an external device, for example, the host 6210 or another external device, and then transmit/receive data to/from the external device. When the memory controller 6220 is configured to communicate with the external device through one or more of various communication protocols, the memory system and the data processing system in accordance with the embodiment may be applied to wired/wireless electronic devices or particularly a mobile electronic device.

Figure 11:
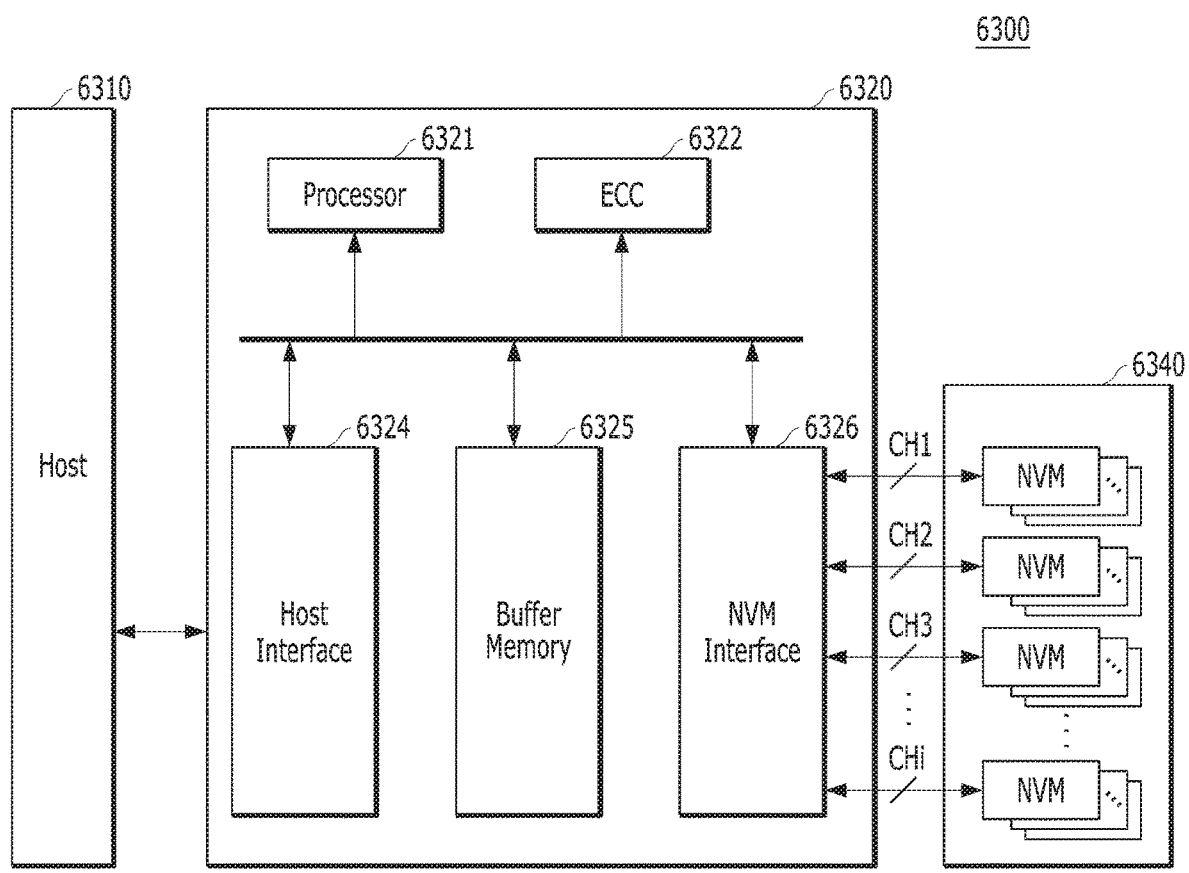

FIG. 11 is a diagram schematically illustrating another example of the data processing system including the memory system in accordance with the embodiment. FIG. 11 schematically illustrates an SSD to which the memory system in accordance with the embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 7. The memory device 6340 may correspond to the memory device 150 in the memory system of FIGS. 1 and 7.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store a data provided from the host 6310 or a data provided from a plurality of flash memories NVM included in the memory device 6340, or temporarily store a meta data of the plurality of flash memories NVM, for example, a map data including a mapping table. The buffer memory 6325 may be embodied by at least one of volatile memories such as a DRAM, a SDRAM, a DDR SDRAM, a LPDDR SDRAM and a GRAM and nonvolatile memories such as a FRAM, a ReRAM, a STT-MRAM and a PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 7 is applied may be provided to embody a data processing system, for example, RAID (Redundant Array of Independent Disks) system. For example, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, to output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, to output data read from the selected SSDs 6300 to the host 6310.

Figure 12:
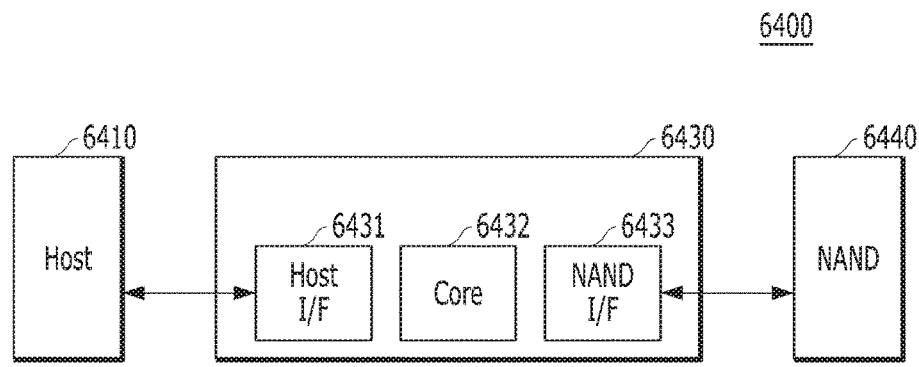

FIG. 12 is a diagram schematically illustrating another example of the data processing system including the memory system in accordance with the embodiment. FIG. 12 schematically illustrates an embedded Mufti-Media Card (eMMC) to which the memory system in accordance with the embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 7. The memory device 6440 may correspond to the memory device 150 in the memory system 110 of FIGS. 1 and 7.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400.

The host interface 6431 may provide an interface function between the controller 6430 and the host 6410. The NAND interface 6433 may provide an interface function between the memory device 6440 and the controller 6430. By the way of example but not limitation, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with the embodiment. FIGS. 13 to 16 schematically illustrate UFS (Universal Flash Storage) systems to which the memory system in accordance with the embodiment is applied.

Referring to FIGS. 13 to 16, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 7. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, UFDs, MMC, SD, mini-SD, and micro-SD.

Figure 13:
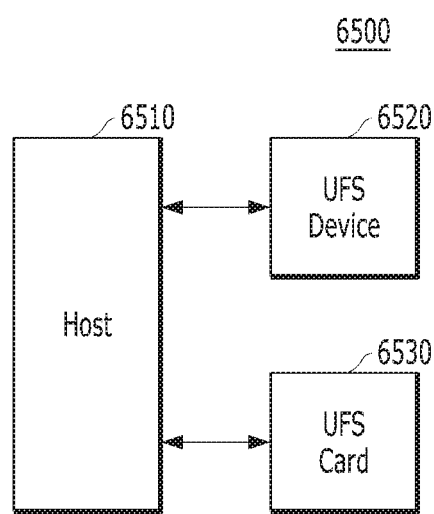

In the UFS system 6500 illustrated in FIG. 13, each of the host 6510, the UFS device 6520 and the UFS card 6530 may include UniPro. The host 6510 may perform a switching operation to communicate with the UFS device 6520 and the UFS card 6530. The host 6510 may communicate with the UFS device 6520 or the UFS card 6530 through link layer switching, for example, L3 switching at the UniPro. For example, the UFS device 6520 and the UFS card 6530 may communicate with each other through link layer switching at the UniPro of the host 6510. In the embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410. A plurality of UFS cards may be connected in parallel or in the form of a star to the UFS device 6520 or connected in series or in the form of a chain to the UFS device 6520.

Figure 14:
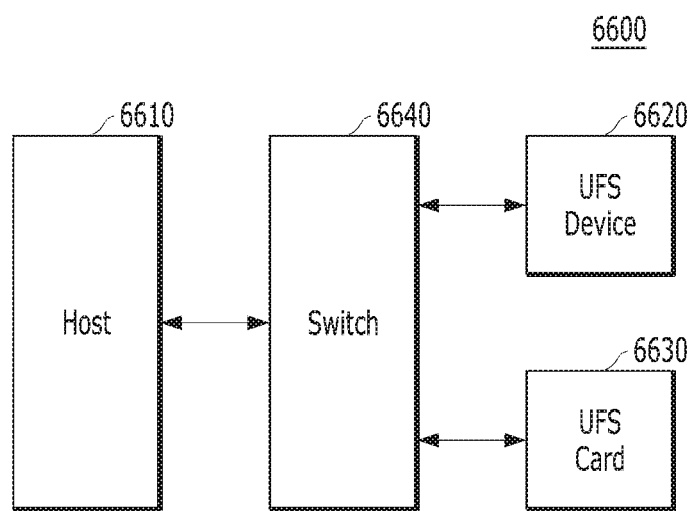

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640. A plurality of UFS cards may be connected in series or in the form of a chain to the UFS device 6620.

Figure 15:
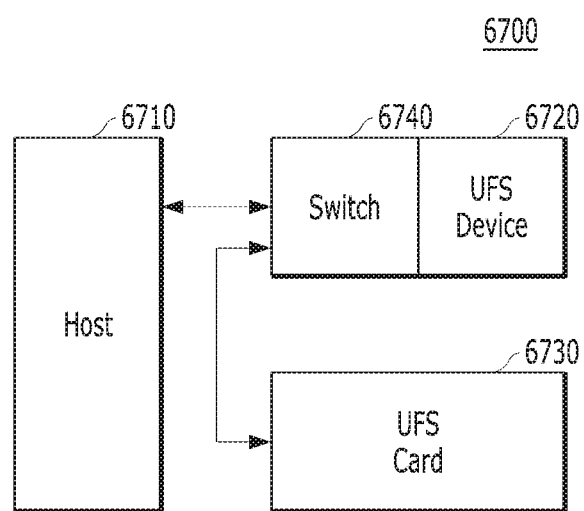

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. For example, the UFS device 6720 and the UFS card 6730 may communicate with each other through link layer switching of the switching module 6740 at the UniPro. The switching module 6740 may be integrated as one module with the UFS device 6720 inside or outside the UFS device 6720. In the embodiment, the configuration in which one UFS device 6720 and one UFS card 6730 are connected to the switching module 6740 has been exemplified for convenience of description. However, a plurality of modules, each including the switching module 6740 and the UFS device 6720, may be connected in parallel or in the form of a star to the host 6710 or connected in series or in the form of a chain to each other. Furthermore, a plurality of UFS cards may be connected in parallel or in the form of a star to the UFS device 6720.

Figure 16:
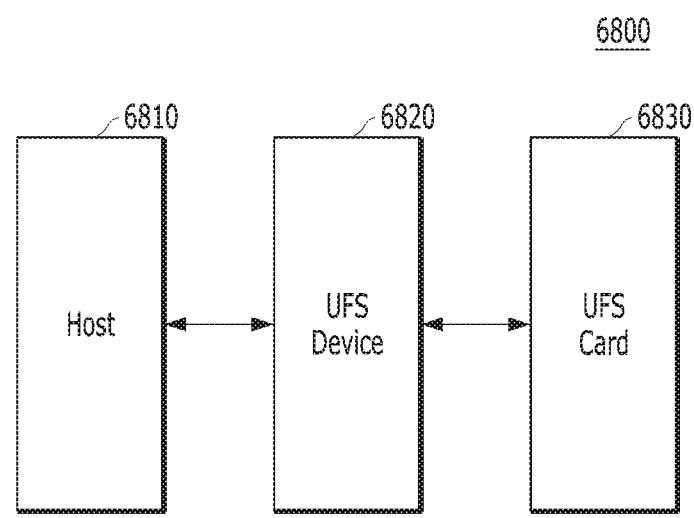

In the UFS system 6800 illustrated in FIG. 16, each of the host 6810, the UFS device 6820 and the UFS card 6830 may include M-PHY and UniPro. The UFS device 6820 may perform a switching operation to communicate with the host 6810 and the UFS card 6830. The UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. For example, the host 6810 and the UFS card 6830 may communicate with each other through target ID switching between the M-PHY and UniPro modules of the UFS device 6820. In the embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 17:
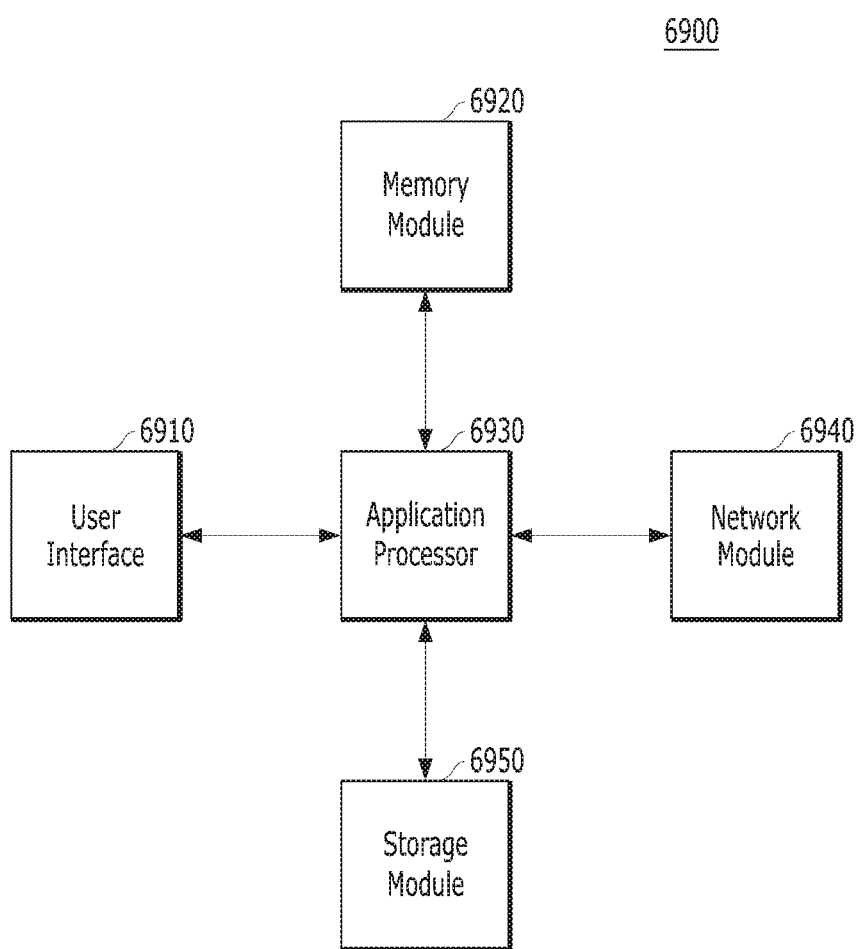

FIG. 17 is a diagram schematically illustrating another example of the data processing system including the memory system in accordance with an embodiment. FIG. 17 is a diagram schematically illustrating a user system to which the memory system in accordance with the embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. By the way of example but not limitation, the application processor 6930 and the memory module 6920 may be packaged and mounted, based on POP (Package on Package).

The network module 6940 may communicate with external devices. By the way of example but not limitation, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash. The storage module 6950 may be provided as a removable storage medium such as a memory card or external drive of the user system 6900. The storage module 6950 may correspond to the memory system 110 described with reference to FIGS. 1 and 7. Furthermore, the storage module 6950 may be embodied as an SSD, an eMMC and an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 7 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. The user interface 6910 may support a function of receiving data from the touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device including a plurality of memory blocks, each including a plurality of pages for storing data; and
   a controller, including a first memory, configured to:
   store segments of data, corresponding to a plurality of commands received from a host, in the first memory,
   store the segments, stored in the first memory, in first memory blocks among the memory blocks by a first unit size in correspondence to data sizes and data types of the segments, and
   store the segments, stored in the first memory blocks, in second memory blocks among the memory blocks by a second unit size,
   wherein the controller stores the segments stored in the first memory, in a second memory included in the host, by the first unit size, merges the segments stored in the second memory, by the second unit size, and stores the segments merged in the second memory, in the second memory blocks.

2. The memory system according to claim 1, wherein, for the segments stored in the second memory blocks, the controller discards corresponding segments in the second memory and erases corresponding segments in the first memory blocks.

3. The memory system according to claim 1, wherein the controller stores the segments stored in the first memory, in the first memory blocks, when the data sizes is smaller than a threshold value, and stores the segments stored in the first memory, in the second memory blocks, when the data sizes are equal to or larger than the threshold value.

4. The memory system according to claim 1, wherein the controller stores the segments stored in the first memory, in the first memory blocks, when the data types are a first type, and stores the segments stored in the first memory, in the second memory blocks, when the data types are a second type.

5. The memory system according to claim 4, wherein, when data types of segments stored in the first memory blocks are changed to the second type in correspondence to aging of and access to the first memory blocks and the segments stored in the first memory blocks, the controller loads the segments stored in the first memory blocks, in the second memory, merges the segments loaded in the second memory, by the second unit size, and stores the segments merged in the second memory, in the second memory blocks.

6. The memory system according to claim 1, wherein, when the host and the memory system are powered on again after a power-off occurs in the host and the memory system, the controller loads the segments stored in the first memory blocks, in the second memory, merges the segments loaded in the second memory, by the second unit size, and stores the segments merged in the second memory, in the second memory blocks.

7. The memory system according to claim 1, wherein, after checking parameters for the first memory blocks, the controller selects third memory blocks among the first memory blocks in correspondence to the parameters, and loads segments stored in the third memory blocks, in the second memory.

8. The memory system according to claim 7, wherein the controller merges the segments loaded in the second memory, by the second unit size, and stores the segments merged in the second memory, in the second memory blocks, and, for the segments stored in the second memory blocks, discards corresponding segments in the second memory and erases corresponding segments in the third memory blocks.

9. The memory system according to claim 1,
   wherein the first memory blocks are memory blocks which store single-bit data, and
   wherein the second memory blocks are memory blocks which store multi-bit data.

10. A method for operating a memory system, comprising:
    receiving a plurality of commands from a host, for a memory device including a plurality of memory blocks, each including a plurality of pages for storing data;
    storing segments of data, corresponding to the plurality of commands, in a first memory included in a controller of the memory device;
    storing the segments, stored in the first memory, in first memory blocks among the memory blocks by a first unit size in correspondence to data sizes and data types of the segments; and
    storing the segments, stored in the first memory blocks, in second memory blocks among the memory blocks by a second unit size,
    wherein the storing by the second unit size comprises:
    storing the segments stored in the first memory, in a second memory included in the host, by the first unit size;
    merging the segments stored in the second memory, by the second unit size; and
    storing the segments merged in the second memory, in the second memory blocks.

11. The method according to claim 10, further comprising:
    discarding corresponding segments in the second memory and erasing corresponding segments in the first memory blocks, for the segments stored in the second memory blocks.

12. The method according to claim 10, further comprising:
    storing the segments stored in the first memory, in the first memory blocks, when the data sizes is smaller than a threshold value; and
    storing the segments stored in the first memory, in the second memory blocks, when the data sizes are equal to or larger than the threshold value.

13. The method according to claim 10, further comprising:
    storing the segments stored in the first memory, in the first memory blocks, when the data types are a first type; and storing the segments stored in the first memory, in the second memory blocks, when the data types are a second type.

14. The method according to claim 13, further comprising:
loading, when data types of segments stored in the first memory blocks are changed to the second type in correspondence to aging of and access to the first memory blocks and the segments stored in the first memory blocks, the segments stored in the first memory blocks, in the second memory; and
merging the segments loaded in the second memory, by the second unit size, and storing the segments merged in the second memory, in the second memory blocks.

15. The method according to claim 10, further comprising:
loading the segments stored in the first memory blocks, in the second memory, when the host and the memory system are powered on again after a power-off occurs in the host and the memory system; and
merging the segments loaded in the second memory, by the second unit size, and storing the segments merged in the second memory, in the second memory blocks.

16. The method according to claim 10, further comprising:
selecting, after checking parameters for the first memory blocks, third memory blocks among the first memory blocks in correspondence to the parameters; and
loading segments stored in the third memory blocks, in the second memory.

17. The method according to claim 16, further comprising:
merging the segments loaded in the second memory, by the second unit size, and storing the segments merged in the second memory, in the second memory blocks; and
discarding corresponding segments in the second memory and erasing corresponding segments in the third memory blocks, for the segments stored in the second memory blocks.

18. The method according to claim 10,
wherein the first memory blocks are memory blocks which store single-bit data, and
wherein the second memory blocks are memory blocks which store multi-bit data.

* * * * *